United States Patent [19]

Bowers

[11] Patent Number: 4,719,092

[45] Date of Patent: Jan. 12, 1988

[54] REDUCTION OF NITROGEN-BASED POLLUTANTS THROUGH THE USE OF UREA SOLUTIONS CONTAINING OXYGENATED HYDROCARBON SOLVENTS

[75] Inventor: Wayne E. Bowers, Clearwater, Fla.

[73] Assignee: Fuel Tech, Inc., Stamford, Conn.

[21] Appl. No.: 784,828

[22] Filed: Oct. 4, 1985

[51] Int. Cl.$^4$ ............................................. C01B 21/00
[52] U.S. Cl. ..................................................... 423/235
[58] Field of Search ............................ 423/235, 235 D

[56] References Cited

U.S. PATENT DOCUMENTS

| 3,900,554 | 8/1975 | Lyon | 423/235 |
|---|---|---|---|
| 4,208,386 | 6/1970 | Arand et al. | 423/235 |
| 4,325,924 | 4/1982 | Arand et al. | 423/235 |
| 4,507,269 | 3/1985 | Dean et al. | 423/235 |
| 4,624,840 | 11/1986 | Dean et al. | 423/235 |

FOREIGN PATENT DOCUMENTS 51-4588  7/1977  Japan ................................. 423/235

Primary Examiner—John Doll
Assistant Examiner—Lori S. Freeman
Attorney, Agent, or Firm—Thaddius J. Carvis

[57] ABSTRACT

Disclosed is a process for maintaining low effluent ammonia contents while reducing nitrogen oxides in an effluent from the combustion of a carbonaceous fuel under oxygen-rich conditions which minimize the production of carbon-based pollutants. An aqueous solution of urea and an oxygenated hydrocarbon is injected into an effluent at a temperature above 1600° F., and preferably above 2000° F. The oxygenated hydrocarbon will be employed at a level effective to reduce the levels of free ammonia in the effluent. This is important when burning fuels containing significant sulfur contents because the free ammonia tends to react with the sulfur compounds to produce solid ammonium sulfate and/or bisulfate which can decrease boiler efficiency.

13 Claims, No Drawings

4,719,092

REDUCTION OF NITROGEN-BASED POLLUTANTS THROUGH THE USE OF UREA SOLUTIONS CONTAINING OXYGENATED HYDROCARBON SOLVENTS

TECHNICAL FIELD

The present invention relates to improvements in the combustion of carbonaceous fuels, and more particularly to improvements in firing large boilers with reduced emissions of nitrogen-based pollutants.

Carbonaceous fuels burn more completely, with reduced emissions of carbon monoxide and unburned hydrocarbons, at oxygen concentrations and combustion air/fuel ratios which permit optimized high flame temperatures. When fossil fuels are used to fire large utility boilers, these temperatures are above 2000° F. and typically from about 2200° F. to 3000° F. Unfortunately, these high temperatures and hot spots of higher temperature tend to result in the production of thermal $NO_x$—the temperatures being so high that free radicals of nitrogen and oxygen are formed and chemically combine as nitrogen oxides ($NO_x$).

The flame temperature can be lowered to reduce $NO_x$ formation by the use of large excesses air or fuel, or a hybrid of both processes known as staged combustion. However, these approaches create excessive carbon-based pollutants. There is no known set of conditions which can simultaneously reduce nitrogen- and carbon-based pollutants to acceptable levels without incurring severe economic penalties.

Various methods have been identified for reducing nitrogen-based pollutants utilizing urea or other nitrogen-containing additives; however, some of these result in the release of free ammonia in the effluent. When fuels contain significant sulfur contents, the gaseous ammonia can react with the sulfurous compounds to form solid ammonium sulfate and/or bisulfate which can rapidly diminish the efficiency of the heat exchangers associated with the boiler.

BACKGROUND ART

In U.S. Pat. No. 3,900,554, Lyon discloses a non-catalytic system for reducing nitrogen monoxide (NO) in a combustion effluent. Lyon discloses that ammonia and specified ammonia precursors or their aqueous solutions, can be injected into the effluent for mixing with the nitrogen monoxide at a temperature within the range of 1600° F. to 2000° F. In one embodiment of the disclosed process, a reducing agent can be mixed with the effluent to permit the reduction reaction to occur at temperatures as low as 1300° F., thereby assuring avoidance of high temperature oxidation of ammonia to nitrogen monoxide. Lyon discloses that hydrogen is preferred as compared to aromatic, parafinic and olefinic hydrocarbons and oxygenated hydrocarbons, and discloses nothing with regard to the control of ammonia in the final effluent.

In U.S. Pat. No. 3,961,018, Williamson discloses the purification of acid gas-containing streams at low temperatures approaching ambient. Williamson discloses contacting the gas stream with an amine vapor in sufficient concentration such that its partial pressure is at least 5% of the total pressure of the gas stream. This system thus requires large amounts of the treating gas and does not address the issue of ammonia gas in the final effluent.

In a somewhat different environment, Goldstein et al, in U.S. Pat. No. 4,061,597 indicate that temperatures within the range of 1000° F. to 1300° F. are effective when using urea for reducing brown fumes caused by nitrogen dioxide ($NO_2$) from catalyst treatment effluents. One example in the patent employs a 30 weight percent aqueous solution of urea. There is no disclosure here again of control of ammonia in the final effluent.

In U.S. Pat. No. 4,325,924, Arand et al disclose the non-catalytic urea reduction of nitrogen oxides in fuel-rich combustion effluents. They indicate that under fuel-rich conditions, aqueous solutions of urea at concentrations of greater than 10%, and preferably greater than 20%, are effective nitrogen oxide reducers at temperatures in excess of 1900° F. This is the effluent from staged combustion which results in the production of high levels of carbonaceous pollutants.

In U.S. Pat. No. 4,208,386, on the other hand, Arand et al disclose that for oxygen-rich effluents, the temperature is in the range of from 1300° F. to 2000° F. for urea added dry or as a solution in water alone or with suitable solvent, such as a 1 to 3 carbon alkanol. The alkanoic solvent is said to be a reducing agent which, like hydrogen, carbon monoxide, etc., is said to enable the effective operating temperature to be lowered to below 1600° F. No function, other than carrier for the urea, was disclosed for the water. And, as with the other patents, no mention is made of reducing ammonia levels in the effluent or of any problem they may cause when employing a fuel with a significant sulfur content.

Accordingly, there is a present need for a process which enables the reduction of nitrogen-based pollutants by operating under efficient oxygen-rich conditions which minimize carbon-based pollutants, and yet permits the control of ammonia levels in the final effluent.

DISCLOSURE OF INVENTION

The present invention provides a process for reducing the concentration of nitrogen oxides in an oxygen-rich effluent from the combustion of a carbonaceous fuel while maintaining low levels of ammonia therein. The process comprises injecting an aqueous solution of urea and an oxygenated hydrocarbon into said effluent at an effluent temperature above 1600° F. A preferred embodiment of the invention provides for introducing a dilute aqueous solution of the urea and the oxygenated hydrocarbon at a plurality of injection points utilizing droplets having a Sauter mean diameter within the range of from about 50 to about 10,000 microns to achieve uniform mixing of the urea and the oxygenated hydrocarbon with the effluent gas. According to one aspect of the invention, the effluents can be at temperatures in excess of 2000° F.

For the purposes of this description, all temperatures herein are measured using an unshielded K-type thermocouple. Droplet sizes are determined with a Malvern 2200 instrument, utilizing a Franhofer diffraction, laser-based system. And, unless otherwise indicated, all parts and percentages are based on the weight of the composition at the particular point of reference.

Compounds useful with this invention include urea and other compounds equivalent in effect. Among the compounds are ammonium carbonate, ammonium formate, ammonium oxalate, ammonium hydroxide and various stable amines including hexamethylenetetramine, and mixtures of these. Thus, unless otherwise specified, reference in this disclosure to urea should not be taken as limiting to urea itself but should extend to urea and all of its equivalents. It is pointed out that the term equivalent is not limited to exact equivalents, and various materials within the listing of equivalents will be optimally operable at some conditions which are different than those for other of the listed materials. Moreover, some of the materials may be more effective than others.

The urea is preferably supplied to the effluent as an aqueous solution, and its concentration in the solution will be at least effective to reduce the level of $NO_x$ in the effluent. The solution can be varied from saturated to very dilute. At higher effluent temperatures, the concentration of urea will be more dilute, say less than 20% at 2000° F., and from 0.5% to 10% at these or higher temperatures. On the other hand, concentrations of from 20% to 40% are more typical for temperatures below 2000° F.

The concentration of the urea within the effluent gas should be sufficient to provide a reduction in nitrogen oxide levels. Typically, the urea will be employed at a molar ratio of urea to the baseline nitrogen oxide level of from about 1 to 4 to about 5 to 1, and will more preferably be within the range of from about 2 to 1 to about 1 to 2.

When sulfur-containing fuels are burned, and the effluents are treated with urea for $NO_x$ reduction, it is important to reduce the level of ammonia in the final effluent by employing an oxygenated material, preferably as part of the urea solution. This free ammonia would otherwise react with the sulfur-containing combustion products to produce ammonium sulfate and/or bisulfate which precipitate as a solid and can rapidly reduce the efficiency of the heat exchange apparatus associated with the boiler.

Exemplary of these oxygenated solvents are low molecular weight ketones, aldehydes and mono, di or polyhydric alcohols of aliphatic hydrocarbons having one to four carbons. Ethylene glycol is a preferred oxygenated hydrocarbon for this purpose. Mixtures of polyols, such as those mixtures of low molecular weight polyols known as hydrogenated starch hydrolysates, can also be employed.

The level of oxygenated hydrocarbon solvent employed should, at a minimum, be an amount effective to reduce the level of free ammonia in the effluent, and can be employed as a total replacement for water. Typically, where required, the oxygenated hydrocarbon will be employed at a level of at least about 10% by weight of the urea in solution. Weight ratios of ethylene glycol to urea, for example, will be within the range of from about 1:4 to 4:1, and preferably closer to unity, e.g., 1:2 to 2:1. These weight ratios apply to other oxygenated solvents as well, which can be employed in combination if desired. The exact concentration of this component, however, will depend upon the overall economics of the process, and must further take into account the effect it has on the size of the droplets, the ability to uniformly disperse the droplets, and the life of the droplets within the effluent under the high temperature conditions existing therein.

The urea solution will often, of necessity, be dispersed within the effluent gas stream at a point where the effluent is at a temperature above 2000° F. Large industrial boilers of the type employed for utility power plants and other large facilities, will typically be water jacketted and have access only at limited points. In the most typical situation, the boiler interior can be accessed only through burner access ports and at access ports above the flame, where the temperatures at full load are typically within the range of from about 2050° F. to about 2600° F. For boilers operating efficiently with gas, the temperature at this point of access will typically fall within the range of from about 2100° F. to about 2600° F., and when fired with coal or oil, will typically fall within the range of about 2050° F. to 2400° F. These temperatures will not permit the effective introduction of solid urea or urea solutions as previously disclosed to the art.

The urea solutions according to the present invention are preferably injected at a number of spaced points where there is sufficient turbulence to distribute the droplets throughout the effluent. The solutions are injected from nozzles which are effective to uniformly form and disperse droplets of the solutions within the flowing effluent stream. The nozzles are located at a sufficient number of points to achieve uniform mixing. Preferably, the size of the droplets of solution will be within the range of from about 10 to about 10,000, and preferably be greater than about 50 microns. The droplet size is important to enable uniform mixing of the urea with the effluent and penetration of the urea sufficiently along the internal boiler path that it can achieve its intended function. The size of the droplets will preferably be increased with increasing temperature. At temperatures below 200° F., droplet sizes of less than 150 microns are quite effective, while at higher temperatures the droplets should be larger, and preferably larger than 500 microns.

BEST MODE FOR CARRYING OUT THE INVENTION

The following example describes the reduction of nitrogen oxide with control of ammonia levels in the effluent from a commercial utility boiler system.

EXAMPLE

A Babcock & Wilcox 110 megawatt boiler was fired with natural gas operating at 50 megawatts. The following tests were performed:

(1) a baseline run with no solution injection;

(2) a solution containing water and 35 percent urea, with the molar ratio of urea to baseline $NO_x$ being 1.0, was sprayed into the boiler by means of 7 nozzles positioned about 48 feet above the top row of burners where the temperature was about 1650° F., the solution being sprayed at a pressure of 30 psig to give droplets of about 10 to 20 microns Sauter mean diameter;

(3) a baseline run on the next consecutive day;

(4) as (2), but employing ethylene glycol in the solution at a concentration of 35%.

The test runs and the data recorded therefrom are set forth in the following table.

| Run | $NH_3$ (ppm) | CO (ppm) | $NO_x$ (ppm)* | $NO_x$ Reduction (%) |
|---|---|---|---|---|
| (1) | — | — | 68 | — |
| (2) | 84 | — | 54 | 21.3 |
| (3) | — | 38 | 81 | — |
| (4) | 23 | 14 | 62 | 23.45 |

*Corrected to 3.0% oxygen.

The above description is for the purpose of teaching the person of ordinary skill in the art how to practice the present invention, and it is not intended to detail all those obvious modifications and variations of it which will become apparent to the skilled worker upon reading the description. It is intended, however, that all such obvious modifications and variations be included within the scope of the present invention which is defined by the following claims.

What is claimed is:

1. A process for maintaining low ammonia concentrations, while reducing the concentration of nitrogen oxides in an oxygen-rich effluent from the combustion of a carbonaceous fuel, the process comprising:

injecting an aqueous solution of urea and an oxygenated hydrocarbon into said effluent as a dispersion of droplets therein at an effluent temperature above 1600° F., the concentration of the urea in solution and the size of the droplets in the dispersion being effective to achieve reduction of nitrogen oxide levels in the effluent and the concentration of the oxygenated hydrocarbon being effective to reduce the level of ammonia in said effluent from the level which would result without said oxygenated hydrocarbon.

2. A process for maintaining low ammonia concentrations, while reducing the concentration of nitrogen oxides in an oxygen-rich effluent from the combustion of a carbonaceous fuel, the process comprising:

injecting an aqueous solution of urea and ethylene glycol into said effluent at an effluent temperature above 1600° F., the concentration of the urea in solution and the size of the droplets in the dispersion being effective to achieve reduction of nitrogen oxide levels in the effluent.

3. A process according to claim 2 wherein the solution is injected into the effluent in amounts sufficient to provide a molar ratio of urea to nitrogen oxides of from 1:4 to 5:1.

4. A process according to claim 3 wherein the ratio of urea to nitrogen oxides is from 1:2 to 2:1.

5. A process according to claim 2 wherein the fuel is sulfur-containing hydrocarbon, the effluent temperature is at least 1650° F., and the solution comprises the oxygenated hydrocarbon in an amount of at least 10% by weight of the urea.

6. A process according to claim 5 wherein the weight ratio of oxygenated hydrocarbon to urea is within the range of from 1:4 to 4:1.

7. A process according to claim 2 wherein the oxygenated hydrocarbon comprises 1 to 4 carbon aliphatic mono, di or polyhydric alcohol.

8. A process according to claim 2 wherein the droplets within the dispersion are uniformly within the range of from about 10 to about 10,000 microns in diameter.

9. A process according to claim 8 wherein the droplets are greater than about 50 microns.

10. A process according to claim 2 wherein the dispersion is injected into the effluent at a temperature above 2000° F.

11. A process according to claim 10 wherein the solution comprises at least 80% solvent, based on the weight of the solution.

12. A process according to claim 11 wherein the solution comprises at least 90% solvent, based on the weight of the solution.

13. A process according to claim 12 wherein the solution comprises from about 2% to about 10% urea based on the weight of the solution.

* * * * *